US010353063B2

(12) United States Patent
Sakamoto et al.

(10) Patent No.: US 10,353,063 B2
(45) Date of Patent: Jul. 16, 2019

(54) RADAR APPARATUS AND SIGNAL PROCESSING METHOD OF RADAR APPARATUS

(71) Applicant: DENSO CORPORATION, Kariya, Aichi-pref. (JP)

(72) Inventors: Mai Sakamoto, Kariya (JP); Koichiro Suzuki, Yokohama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 366 days.

(21) Appl. No.: 15/318,192

(22) PCT Filed: May 26, 2015

(86) PCT No.: PCT/JP2015/065086
§ 371 (c)(1),
(2) Date: Dec. 12, 2016

(87) PCT Pub. No.: WO2015/190283
PCT Pub. Date: Dec. 17, 2015

(65) Prior Publication Data
US 2017/0102459 A1    Apr. 13, 2017

(30) Foreign Application Priority Data

Jun. 13, 2014    (JP) .................................. 2014-122440

(51) Int. Cl.
    *G01S 13/34*    (2006.01)
    *G01S 13/38*    (2006.01)
    (Continued)

(52) U.S. Cl.
    CPC ............ *G01S 13/584* (2013.01); *G01S 7/354* (2013.01); *G01S 7/40* (2013.01); *G01S 7/415* (2013.01);
    (Continued)

(58) Field of Classification Search
    CPC ..... G01S 13/931; G01S 13/48; G01S 13/5244; G01S 2013/9375; G01S 1/02;
    (Continued)

(56) References Cited

U.S. PATENT DOCUMENTS

6,903,678 B2*    6/2005   Kumon ................. G01S 13/345
                                                          342/107
6,937,185 B1*    8/2005   Collazo ............... G01S 13/5244
                                                          342/159
(Continued)

*Primary Examiner* — Olumide Ajibade Akonai
(74) *Attorney, Agent, or Firm* — Knobbe, Martens, Olson & Bear, LLP (57) ABSTRACT

A radar apparatus includes a targeting unit that irradiates a radar wave and recognizes a detection subject using a reflected wave thereof. The targeting unit extracts, as a target, a peak that is confirmed to have historical connection over measurement cycles equal to or more than a predetermined targeting threshold, from peaks extracted from a power spectrum generated by frequency analysis. A rainy-weather determining unit determines that weather is rainy when a number of erroneous detections is greater than a predetermined rainy-weather determination threshold. The number of erroneous detections is a number of peaks that have been detected in a previous measurement cycle or earlier by the targeting unit and are not confirmed to have historical connection to a peak detected in a current measurement cycle. A parameter updating unit updates the targeting threshold so as to be a larger value as the number of erroneous detections increases when the rainy-weather determining unit determines that the weather is rainy.

14 Claims, 11 Drawing Sheets

(51) Int. Cl.
*G01S 13/58* (2006.01)
*G01S 13/93* (2006.01)
*G01S 13/95* (2006.01)
*G01S 7/41* (2006.01)
*G01S 7/35* (2006.01)
*G01S 7/40* (2006.01)
*G01S 13/536* (2006.01)
*G01S 13/72* (2006.01)

(52) U.S. Cl.
CPC ............ *G01S 13/347* (2013.01); *G01S 13/38* (2013.01); *G01S 13/536* (2013.01); *G01S 13/931* (2013.01); *G01S 13/951* (2013.01); *G01S 13/726* (2013.01); *G01S 2007/4039* (2013.01); *G01S 2013/9353* (2013.01)

(58) Field of Classification Search
CPC ...... G01S 13/347; G01S 13/38; G01S 13/584; G01S 13/726; G01S 13/95; G01S 7/354; G01S 7/415; G01S 2007/4039; G01S 17/95; G01S 2013/9385; G01S 7/414; G01S 15/885; Y02A 90/18; B60W 2550/14; B60W 2530/14; B60W 30/143; G01W 1/10
See application file for complete search history.

(56) References Cited

U.S. PATENT DOCUMENTS

| | | | | |
|---|---|---|---|---|
| 8,264,395 | B2* | 9/2012 | Fujikawa | G01S 7/414 342/26 R |
| 8,581,774 | B2* | 11/2013 | Heilmann | G01S 7/41 342/26 R |
| 8,749,429 | B2* | 6/2014 | Heilmann | G01S 7/4004 342/26 D |
| 2010/0321231 | A1 | 12/2010 | Nakahama | |
| 2011/0298656 | A1* | 12/2011 | Bechler | G01S 13/931 342/26 R |
| 2016/0327687 | A1* | 11/2016 | Nylander | G01W 1/14 |

\* cited by examiner

DRAWN AT OPEN CYCLES IN WHICH RAIN IS DETERMINED

RADAR APPARATUS AND SIGNAL PROCESSING METHOD OF RADAR APPARATUS

CROSS-REFERENCE TO RELATED APPLICATION

This application is a U.S. National Phase Application under 35 U.S.C. 371 of International Application No. PCT/JP2015/065086 filed on May 26, 2015 and published in Japanese as WO 2015/190283 A1 on Dec. 17, 2015. This application is based on and claims the benefit of priority from Japanese Patent Application No. 2014-122440, filed Jun. 13, 2014. The entire disclosures of all of the above applications are incorporated herein by reference.

TECHNICAL FIELD

The present invention relates to a radar apparatus and a signal processing method of the radar apparatus. In particular, the present invention relates to a radar apparatus that is configured to identify and remove clutter, and a signal processing method of the radar apparatus.

BACKGROUND ART

Radar apparatuses are currently used in various fields. One such radar apparatus is a type of radar apparatus that is referred to as a dual-frequency continuous wave (CW) radar. The dual-frequency CW radar has a higher detection sensitivity for speed compared to a frequency-modulated continuous wave (FMCW) radar. In addition, the dual-frequency CW radar is useful in detection of a target that has low reflection intensity, such as a pedestrian. Also, the dual-frequency CW radar is capable of detecting even a small target as long as the target has speed. Therefore, the dual-frequency CW radar is known to also detect clutter, such as rain and snow, that does not require detection. Here, clutter refers to unnecessary reflected waves that are generated as a result of radio waves from a radar being reflected by a sea surface, rain, or the like.

A technology is known in which the presence of such clutter is determined based on variations in the power level of reception signals (refer to, for example, PTL 1). The above-described technology takes advantage of the fact that, whereas power variation of a target to be detected (such as a ship on the sea) is large, power variation of rain/snow clutter (unnecessary reflected waves generated as a result of reflection by rain, snow, and the like) is relatively small.

CITATION LIST

Patent Literature

[PTL 1] JP-A-2011-2425

SUMMARY OF INVENTION

Technical Problem

Meanwhile, in an on-board radar of which a target to be detected is a vehicle on land, power variation of the target is small compared to that of a ship on the sea. In addition, a premise of the conventional technology is that the power variation of clutter is small. However, in the conventional technology, when the effects of wind and the like are received, the power variation of raindrop clutter (unnecessary reflected waves generated as a result of reflection by rain, droplets, and the like) becomes larger. As described above, on land, a clear difference in the differences in power variation between clutter and a target does not easily occur. In addition, accurately identifying and removing clutter by a method of the convention technology is difficult.

The present invention has been achieved in light of such issues. An object of the present invention is to provide a radar apparatus that improves the capability of identifying and removing clutter.

Solution to Problem

A radar apparatus of the present invention detects at least a relative speed to a target using Doppler effect, and includes a frequency analyzing unit, a targeting unit, a rainy-weather determining unit, and a parameter updating unit.

The frequency analyzing unit acquires a beat signal that is generated from a transmission signal and a reception signal at each predetermined measurement cycle. Furthermore, the frequency analyzing unit generates a power spectrum by performing frequency analysis on the beat signal. The targeting unit extracts, as a target, a peak that is confirmed to have historical connection over measurement cycles equal to or more than a predetermined targeting threshold, from peaks extracted from the power spectrum generated by the frequency analyzing unit. In addition, the targeting unit sets a number of peaks that have been detected in a previous measurement cycle or earlier by the targeting means and are not confirmed to have historical connection to a peak detected in a current measurement cycle as a number of erroneous detections. The rainy-weather determining unit determines that weather is rainy when the number of erroneous detections is greater than a predetermined rainy-weather determination threshold. The parameter updating unit updates the targeting threshold so as to be a larger value as the number of erroneous detections increases when the rainy-weather determining unit determines that the weather is rainy.

That is, in rainy weather, clutter (and thus, peaks in the power spectrum) generated as a result of raindrops and the like increases. In addition, in accompaniment thereto, the number of erroneous detections that is the number of peaks that disappear without being targeted also increases. Therefore, whether or not the weather is rainy can be determined by the number of erroneous detections.

In the present invention, the targeting threshold is increased when the weather is determined to be rainy. Therefore, in the present invention, clutter can be suppressed from being erroneously targeted. That is, the capability of identifying and removing the clutter can be improved.

Reference numbers within the parentheses recited in the claims indicate corresponding relationships with specific means according to an embodiment described hereafter as an aspect, and do not limit the technical scope of the present invention.

In addition, the present invention can be actualized through various aspects in addition to the above-described radar apparatus, such as a system of which the radar apparatus is a constituent element, a program for enabling a computer to function as the radar apparatus, and a clutter removal method.

DESCRIPTION OF EMBODIMENTS

An embodiment to which the present invention is applied will hereinafter be described with reference to the drawings.
<Overall Configuration>

Figure 1:
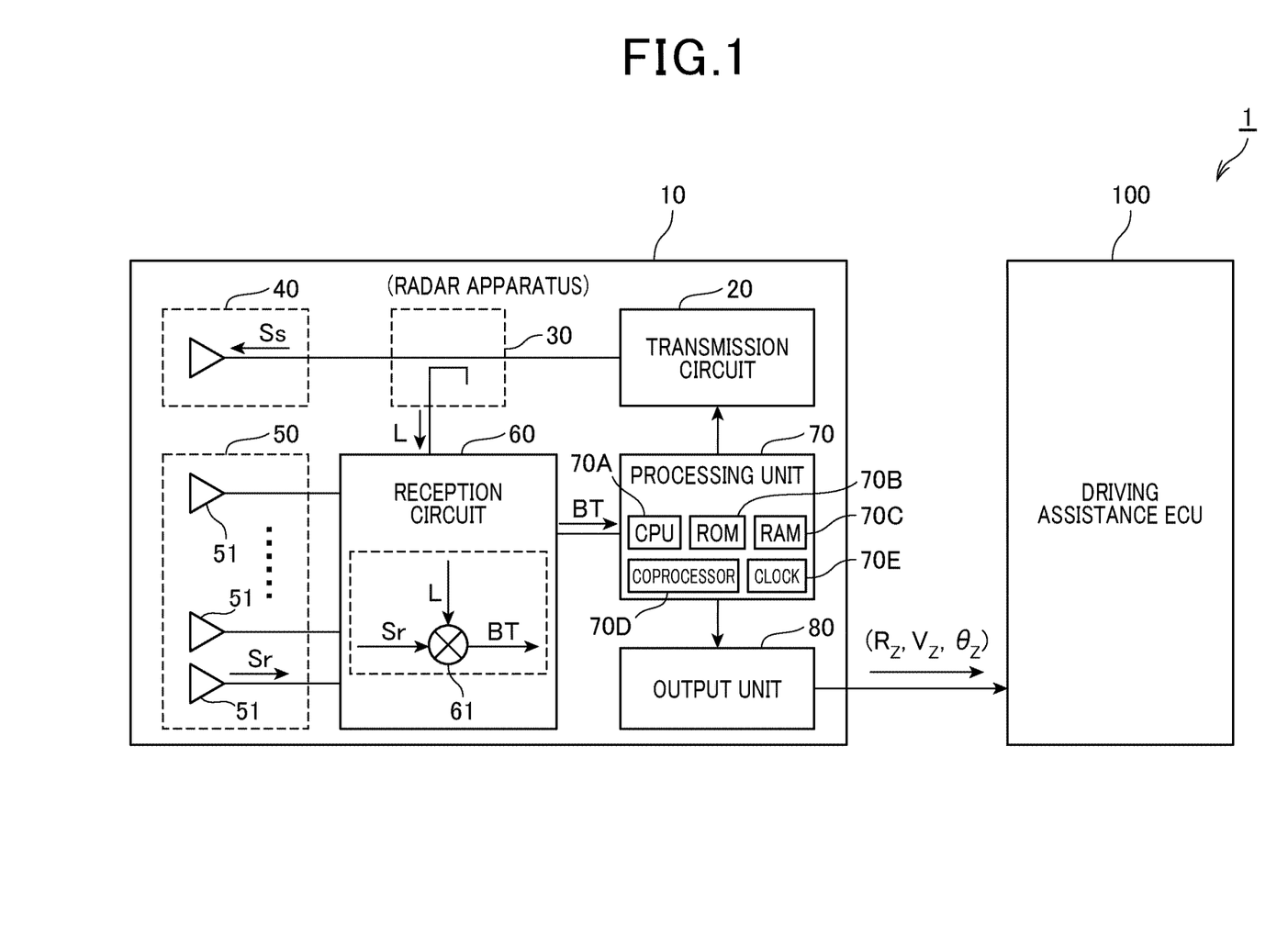
FIG. 1 is a block diagram of an overall configuration of an on-board system according to an embodiment.

FIG. 1 shows an overall configuration of the entirety of an on-board system 1 to which a radar apparatus is applied, according to the embodiment. As shown in FIG. 1, the on-board system 1 includes a radar apparatus 10 and a driving assistance electronic control unit (ECU) 100. The on-board system 1 is mounted in a vehicle, such as a four-wheel automobile. A signal processing method of the present invention is performed by the radar apparatus. Therefore, the signal processing method will be described together with a description of the functions of the radar apparatus.

The radar apparatus 10 emits radar waves and receives reflected waves. In addition, the radar apparatus 10 observes a distance R to a target that is an object ahead that has reflected the radar waves, a speed V of the target, and an orientation θ of the target, based on a reception signal thereof. Furthermore, the radar apparatus 10 inputs observation values (Rz, Vz, and θz) to the driving assistance ECU 100.

The driving assistance ECU 100 performs various processes for assisting in driving of the vehicle by a driver, based on the observation values (Rz, Vz, and θz) of each target inputted from the radar apparatus 10. As processes related to driving assistance, for example, there is a process for displaying a warning to the driver that an approaching object is present, and a process for performing vehicle control to avoid collision with an approaching object through control of a brake system, a steering system, or the like.

The radar apparatus 10 includes a transmission circuit 20, a distributor 30, a transmission antenna 40, a reception antenna 50, a reception circuit 60, a processing unit 70, and an output unit 80. The radar apparatus 10 is configured as a so-called dual-frequency CW radar.

The transmission circuit 20 is a circuit for supplying a transmission signal Ss to the transmission antenna 40. The transmission circuit 20 inputs a millimeter-wave-band high-frequency signal to the distributor 30 that is positioned upstream of the transmission antenna 40. Specifically, the transmission circuit 20 generates a high-frequency signal having a first frequency (f1) and a high-frequency signal having a second frequency (f2) that slightly differs in frequency from the first frequency (f1), in an alternating manner at a short time interval, and inputs the generated high-frequency signals to the distributor 30.

The distributor 30 performs power distribution of the high-frequency signal inputted from the transmission circuit 20 to a transmission signal Ss and a local signal L.

Figure 2:
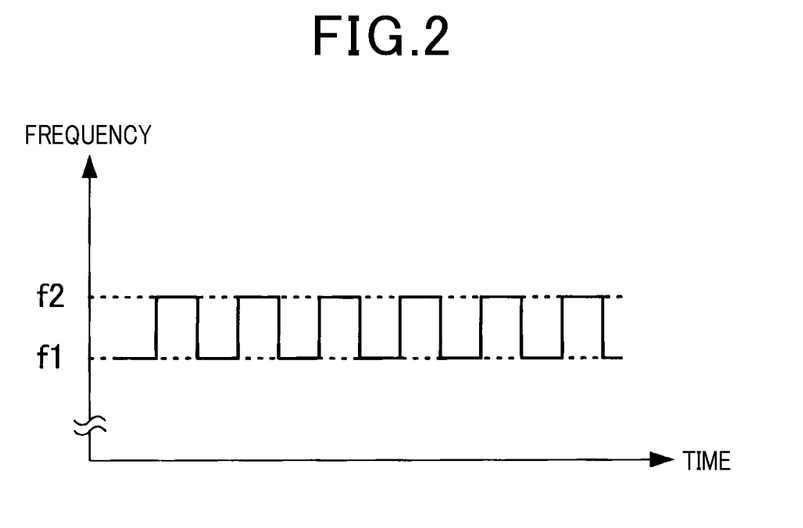
FIG. 2 is a timing diagram showing a transmission mode of a dual-frequency CW used in a radar apparatus according to the embodiment.

The transmission antenna 40 emits a radar wave ahead of the vehicle based on the transmission signal Ss supplied from the distributor 30. The radar wave has a frequency that corresponds to the transmission signal Ss. As a result, as shown in FIG. 2, a radar wave having the first frequency (f1) and a radar wave having the second frequency (f2) are alternately outputted.

The reception antenna 50 is an antenna for receiving a radar wave (reflected wave) reflected by a target. The reception antenna 50 is configured as a linear array antenna in which a plurality of antenna elements 51 are arrayed in a single row. A reception signal Sr of the reflected wave from each antenna element 51 is inputted to the reception circuit 60.

The reception circuit 60 processes the reception signal Sr inputted from each antenna element 51 configuring the reception antenna 50. Furthermore, the reception circuit 60 generates and outputs a beat signal BT for each antenna element 51. Specifically, for each reception element 51, the reception circuit 60 mixes the reception signal Sr inputted from the antenna element 51 and the local signal L inputted from the distributor 30 using a mixer 61, and thereby generates and outputs the beat signal BT for each antenna element 51.

However, the process until the beat signal BT is outputted includes a process for amplifying the reception signal Sr, a process for removing unnecessary signal components from the beat signal BT, and a process for converting the beat signal BT to digital data. In this way, the reception circuit 60 converts the generated beat signal BT for each antenna element 51 to digital data and outputs the digital data. The outputted beat signal BT for each antenna element 51 is inputted to the processing unit 70.

The processing unit 70 is composed of a known microcomputer that includes a central processing unit (CPU) 70A that functionally performs various means related to the present invention, a read-only memory (ROM) 70B that serves as a recording medium, a random access memory (RAM) 70C, a coprocessor 70D that performs a fast Fourier transform (FFT) process and the like, and a clock 70E. The ROM 70B stores therein, in advance, code expressing various programs (such as a target detection process) described hereafter. Therefore, the CPU 70A is configured to be capable of calling up a program stored in the ROM 70B to a work area thereof and running the program. In addition, the RAM 70C is used to temporarily store data when the CPU 70A is performing a process. The coprocessor 70D handles FFT as a dedicated process, as described hereafter. The clock 70E generates a clock signal for operation.

In this way, the processing unit 70 analyzes the beat signal BT for each antenna element 51, and thereby performs the various processes that are provided, including the target detection process for calculating the observation values (Rz, Vz, and θz) for each target that reflects the radar waves.

<Target Detection Process>

The target detection process performed by the processing unit 70 (that is, the CPU 70A) will be described with reference to a flowchart in FIG. 3. The present process is repeatedly performed each time a radar wave is transmitted and received. Hereafter, an execution cycle of the present process is also referred to as a measurement cycle.

When the present process is started, at S110, the processing unit 70 acquires the beat signal BT (digital data) generated for each antenna element 51.

At S120, the processing unit 70 performs the FFT process (frequency analysis process) on the acquired beat signal BT and generates a power spectrum for each antenna element 51 and for each of first and second beat signals included in the beat signal BT. The power spectrum indicates the power of the reflected wave in each frequency bin. Here, the processing subject is the dual-frequency CW. Therefore, the frequency bin corresponds to a relative speed between an own vehicle and an object that has reflected the radar wave.

The first beat signal referred to herein is a beat signal BT that is generated when the mixer 61 mixes the reception signal Sr and the local signal L having the first frequency (f1). In addition, the second beat signal is a beat signal BT that is generated when the mixer 61 mixes the reception signal Sr and the local signal L having the second frequency (f2). Time required for transmission and reception of a radar wave is miniscule. Therefore, the first beat signal includes reflected wave components of the radar wave having the first frequency (f1). In addition, the second beat signal includes reflected wave components of the radar wave having the second frequency (f2).

At S130, the processing unit 70 calculates, by the FFT process, an average power spectrum that is the average of the power spectrums for each antenna element 51. Furthermore, at S130, the processing unit 70 extracts a peak (identified by the frequency bin) at which the power is equal to or greater than a predetermined peak detection threshold, from the average power spectrum. A frequency difference is present between the first frequency (f1) and the second frequency (f2). However, the difference is slight and can be ignored in frequency bin units. Therefore, the difference is not a problem when the average power spectrum is calculated.

At S140, with a target detected in a previous measurement cycle or earlier as a known target, the processing unit 70 tracks the above-described known target. Furthermore, at S140, the processing unit 70 performs a tracking process to extract a peak that is confirmed to have historical connection to the known target (that is, to be the same target), from the peaks detected at foregoing S130, by tracking the known target. In the tracking process, for example, the processing unit 70 determines estimated observation values of the known target in the current measurement cycle based on the observation values (Rz, Vz, and θz) of the known target. Furthermore, in this tracking process, the processing unit 70 determines provisional observation values with each peak as a provisional target, together with the estimated observation values, and determines that a connection relationship is present regarding a peak that has a provisional observation value of which a distance (degree of similarity) to the estimated observation value is a predetermined value or less. The tracking process is not limited thereto. A known method can be used.

At S150, the processing unit 70 performs a targeting process for extracting a peak based on the target, from peaks that are not targeted. At subsequent S160, the processing unit 70 generates the observation values (Rz, Vz, and θz) for targets subjected to the tracking process (excluding those determined to have disappeared based on the tracking process) and targets newly extracted by the targeting process. Furthermore, at S160, the processing unit 70 performs input to the driving assistance ECU 100 via the output unit 80 and ends the present process.

The observation values (Rz, Vz, and θz) are generated by a method known in dual-frequency CW radars. In particular, the observation value Vz is generated based on frequency information (frequency bin) of the observed peak. In addition, the observation values Rz and θz are generated based on phase information (the phase difference between the first and second beat signals and the phase difference between antenna elements) of the observed peak.

<Targeting Process>

Figure 4:
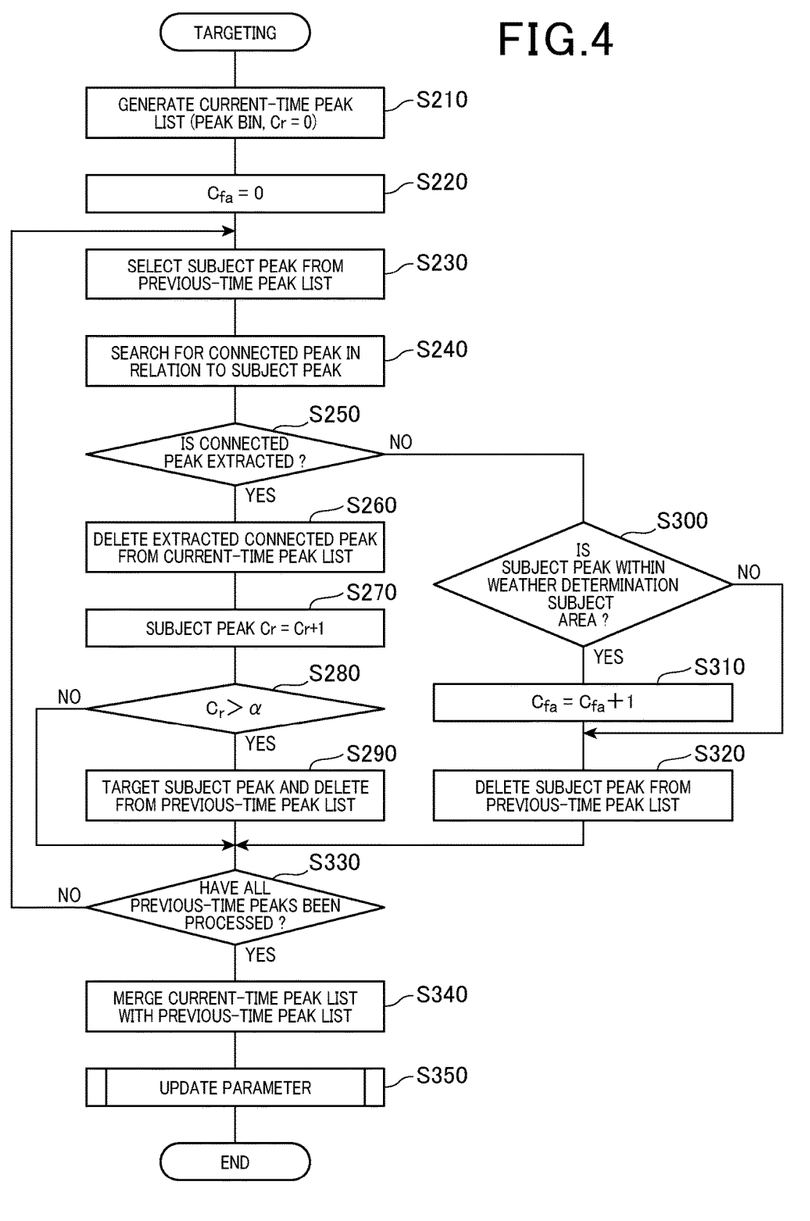
FIG. 4 is a flowchart of a targeting process performed during the target detection process.

Next, details of the targeting process performed at foregoing S150 will be described with reference to a flowchart in FIG. 4.

When the present process is started, at S210, the processing unit 70 generates a current-time peak list. The current-time peak list lists peaks from the peaks detected in the current measurement cycle, excluding peaks that are determined to have a connection relationship with the known target in the tracking process (S140). For each listed peak, the processing unit 70 stores the frequency bin (referred to, hereafter, as a "peak bin") in which the peak is detected and a number-of-connections count value Cr that expresses the number of times that historical connection has been confirmed for the peak, in the current-time peak list, and resets the number-of-connections count value Cr to zero.

At S220, the processing unit 70 resets a count value $C_{fa}$ of a number of erroneous detections that is a number of peaks determined not to be a target, to zero.

At S230, the processing unit 70 selects a single subject peak from a previous-time peak list. The previous-time peak list is a peak list that lists peaks for which determination of whether or not the peak is a target could not be made in the previous measurement cycle. In addition, the previous-time peak list generated at S340 (described hereafter) in the previous measurement cycle is used.

At S240, the processing unit 70 references the current-time peak list and searches for a connected peak, with a current-time peak of which the distance from the subject peak (distance in frequency bin units) is within a reference number L[BIN] (L being an integer) as the connected peak.

At S250, the processing unit 70 determines whether or not a connected peak is extracted based on the search result. When a connected peak is extracted, the processing unit 70 transitions the process to S260.

At S260, the processing unit 70 deletes the extracted connected peak from the current-time peak list. At subsequent S270, the processing unit 70 increments the number-of-connections count value Cr of the subject peak (Cr=Cr+1).

At S280, the processing unit 70 determines whether or not the number-of-connections count value Cr is greater than a targeting threshold α. Here, the targeting threshold α is a threshold for detecting target information in which noise is reduced from the reflected wave. When the number-of-connections count value Cr is greater than the targeting threshold α, the processing unit 70 transitions the process to S290. The processing unit 70 then targets the subject peak (sets the subject peak to be a subject for tracking), deletes the subject peak from the previous-time peak list, and advances the process to S330. Meanwhile, when the number-of-connections count value Cr is the targeting threshold α or less, the processing unit 70 skips S290 and advances the process to S330. The processing unit 70 sets the targeting threshold α to an initial value (such as 2) at startup of the radar apparatus 10. Subsequently, the processing unit 70 updates and resets the targeting threshold α at S430 and S440, described hereafter.

At foregoing S250, the processing unit 70 transitions the process to S300 when a connected peak is not extracted. Furthermore, the processing unit 70 determines whether or not the peak bin of the subject peak is within a weather determination subject area W (see FIG. 7). A method for setting the weather determination subject area W will be described hereafter.

When the peak bin of the subject peak is within the weather determination subject area W, the processing unit 70 transitions the process to S310. Furthermore, the processing unit 70 increments the number-of-erroneous-detections count value $C_{fa}$ ($C_{fa}=C_{fa}+1$) and advances the process to S320. Meanwhile, when the peak bin of the subject peak is outside of the weather determination subject area W, the processing unit 70 skips S310 and advances the process to S320.

At S320, the processing unit 70 deletes the subject peak from the previous-time peak list and advances the process to S330.

At S330, the processing unit 70 determines whether or not the above-described processes at S240 to S320 have been performed for all previous-time peaks listed in the previous-time peak list. When a previous-time peak for which the processes have not yet been performed is present, the processing unit 70 returns to S230 and repeatedly performs the above-described processes. Meanwhile, when the processes have been performed for all previous-time peaks, the processing unit 70 advances the process to S340. The processing unit 70 merges the current-time peak list with the previous-time peak list, and generates a previous-time peak list to be used in a next measurement cycle.

At step S350, the processing unit 70 performs a parameter update process to update the targeting threshold α based on the weather and ends the present process.

Figure 5:
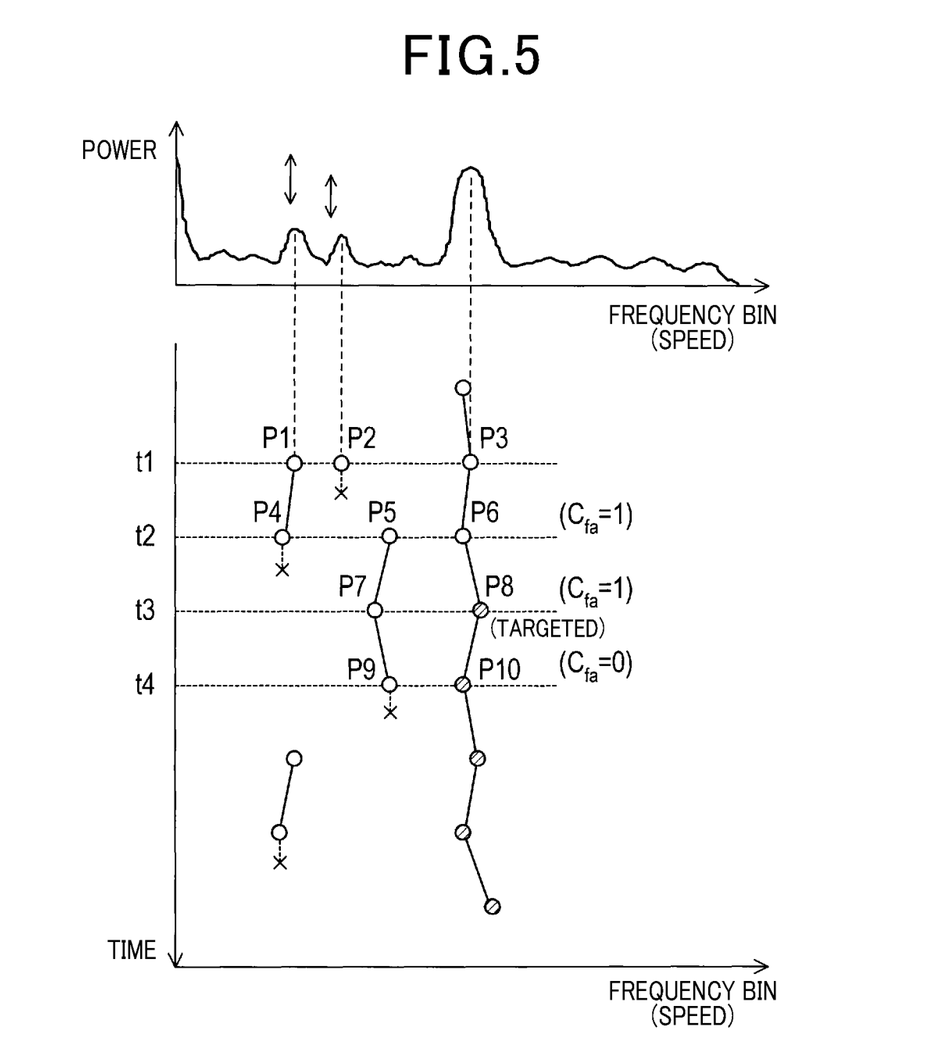
FIG. 5 is an explanatory diagram of an operation example based on the targeting process.

An operation example based on the present process will be described with reference to FIG. 5. The previous-time peak list ultimately generated in a certain measurement cycle (time t1) is {P1(0), P2(0), P3(1)}. Here, Pi(Cr) expresses a peak configuring the peak list. The number within the parentheses expresses the number-of-connections count value Cr. However, the targeting threshold α is set to 2.

In a measurement cycle (time t2), the processing unit 70 generates the current-time peak list {P4(0), P5(0), P6(0)}. In addition, historical connection is confirmed between peaks P1 and P4 and between peaks P3 and P6. In this case, peaks P4 and P6 are deleted from the current-time peak list, and peak P5 remains. Meanwhile, the processing unit 70 deletes peak P2 that has no connected peak from the previous-time peak list, and increments the number-of-connections count values Cr of remaining peaks P1 and P3. Therefore, the previous-time peak list becomes {P1(1), P3(2)}. As a result, the new previous-time peak list obtained by merging both peak lists becomes {P1(1), P3(2), P5(0)}. In addition, at this time, the previous-time peak deleted without a historical connection having been confirmed is a single peak (peak P2). Therefore, the number-of-erroneous-detection count value is $C_{fa}=1$.

In a measurement cycle (time t3), the processing unit 70 generates the current-time peak list {P7(0), P8(0)}. In addition, the processing unit 70 confirms historical connection between peaks P4 and P7 and between peaks P3 and P8. In this case, the processing unit 70 deletes peaks P7 and P8 from the current-time peak list and the current-time peak list becomes empty. The processing unit 70 deletes peak P1 that has no connected peak from the previous-time peak list, and increments the number-of-connections count values of remaining peaks P3 and P5. Furthermore, because the incremented number-of-connections count value of peak P3 is Cr=3 and greater than the targeting threshold α (=2), peak P3 is targeted. In addition, peak P3 is deleted from the previous-time peak list. As a result, the new previous-time peak list obtained by merging both peak lists becomes {P5(1)}. In addition, at this time, the previous-time peak deleted without a historical connection having been confirmed is a single peak (peak P1). Therefore, the number-of-erroneous-detection count value is $C_{fa}=1$.

In a measurement cycle (time t4), the processing unit 70 generates the current-time peak list {P9(0)}. In addition, the processing unit 70 confirms historical connection between peaks P5 and P9. Peak P10 is not listed in the current-time peak list because historical connection to the known target is confirmed in the tracking process. In this case, the processing unit 70 deletes peak P9 from the current-time peak list, and the current-time peak list becomes empty. No peaks are deleted from the previous-time peak list. The number-of connections count value is incremented. As a result, the new previous-time peak list obtained by merging both peak lists becomes {P5(2)}. In addition, at this time, a previous-time peak deleted without a historical connection having been confirmed is not present. Therefore, the number-of-erroneous-detection count value is $C_{fa}=0$.

<Parameter Update>

Figure 6:
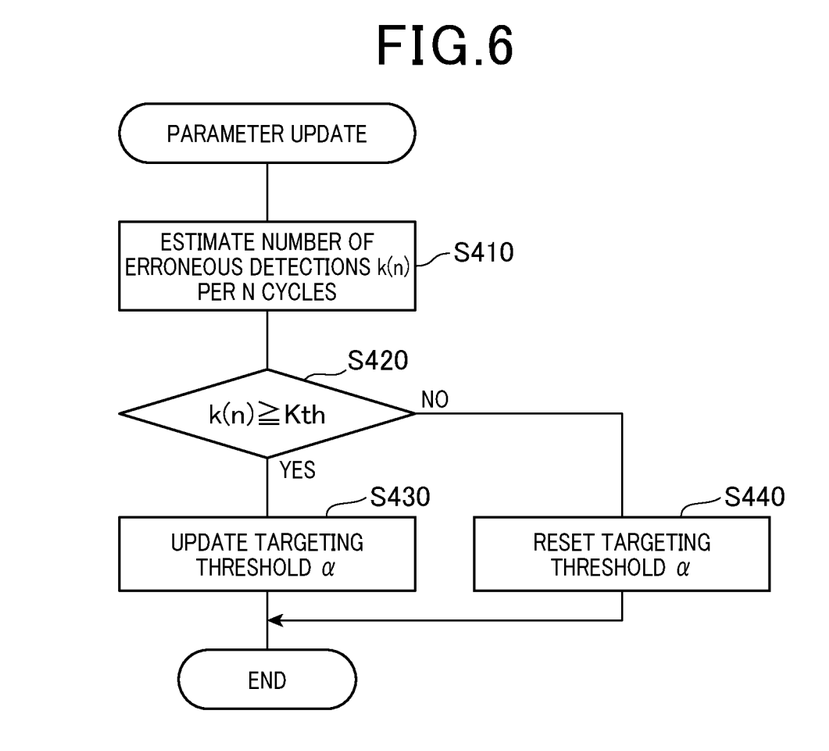
FIG. 6 is a flowchart of a parameter update process performed during the targeting process.

Next, details of the parameter update process performed by the processing unit 70 at foregoing S350 will be described with reference to a flowchart in FIG. 6.

When the present process is started, at S410, the processing unit 70 calculates the number of erroneous detections k(n) per N (for example, N=100) cycles, using expression (1) or expression (2) based on the number-of-erroneous-detections count value $C_{fa}$. However, expression (1) is used while the number of measurement cycles n has not reached N, and expression (2) is used after the number of measurement cycles n reaches N.

[Formula 1]

$$k(n) = \frac{N \cdot (k(n-1) + C_{fa})}{n} \quad (1)$$

$$k(n) = \beta \cdot k(n-1) + (1-\beta) \cdot C_{fa} \quad (2)$$

where $$\beta = \frac{N-1}{N+1}$$

At S420, the processing unit 70 determines whether or not the number of erroneous detections k(n) is a rainy-weather determination threshold Kth or more. The processing unit 70 uses the rainy-weather determination threshold Kth that has been predetermined by a method below. That is, with K=k(n), the processing unit 70 sets, as the rainy-weather determination threshold Kth, K (integer value) such that a not-rainy-weather likelihood L(K) determined by expression (3) is less than a predetermined allowable value.

[Formula 2]

$$L(K) = 1 - \sum_{k=1}^{K} \frac{\lambda^k e^{-\lambda}}{k!} \quad (3)$$

Figure 7:
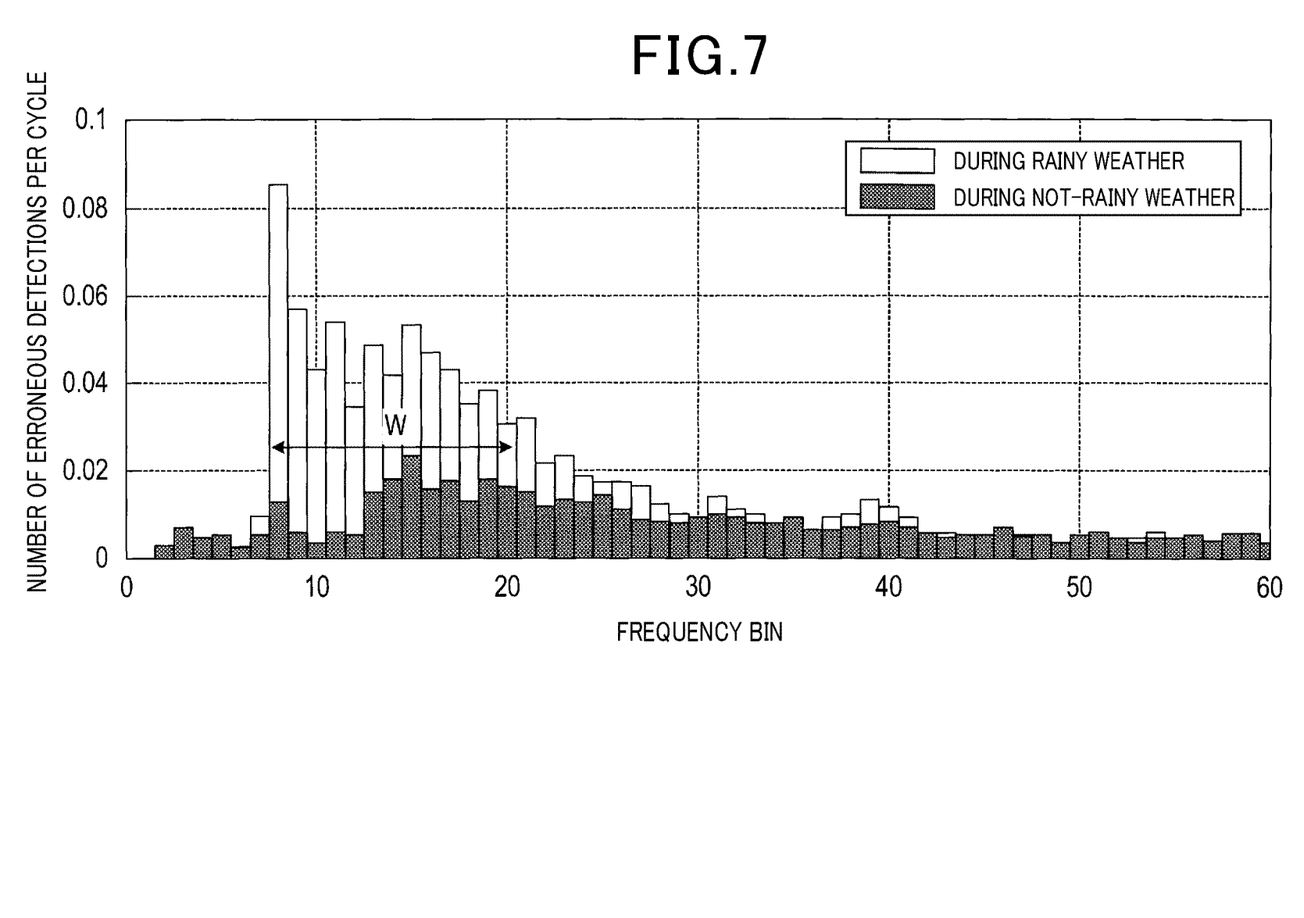
FIG. 7 is a distribution diagram showing measurement results of the number of erroneous detections in target detection for each frequency bin.

However, λ is a total sum of the number of erroneous detections per measurement cycles (N cycles) during not-rainy weather in the weather determination subject area W, under a supposition that a distribution (see FIG. 7) determined by the number of erroneous detections during not-rainy weather (the number of times not-rainy weather is erroneously detected as rainy weather) being counted for each frequency bin follows a Poisson distribution. In addition, λ is a value that is experientially set from measurement results and the like. In FIG. 7, a distribution of the number of erroneous detections during rainy weather (the number of times rainy weather is erroneously detected as not-rainy weather) is also shown, together with that of the number of erroneous detections during not-rainy weather. The weather determination subject area W also used in foregoing S300 is set based on this distribution of the number of erroneous detections. In addition, the weather determination subject area W uses a range (from the 8th bin to the 20th bin, herein) over which the difference between rainy weather and not-rainy weather is considered to be significantly apparent.

Figure 8:
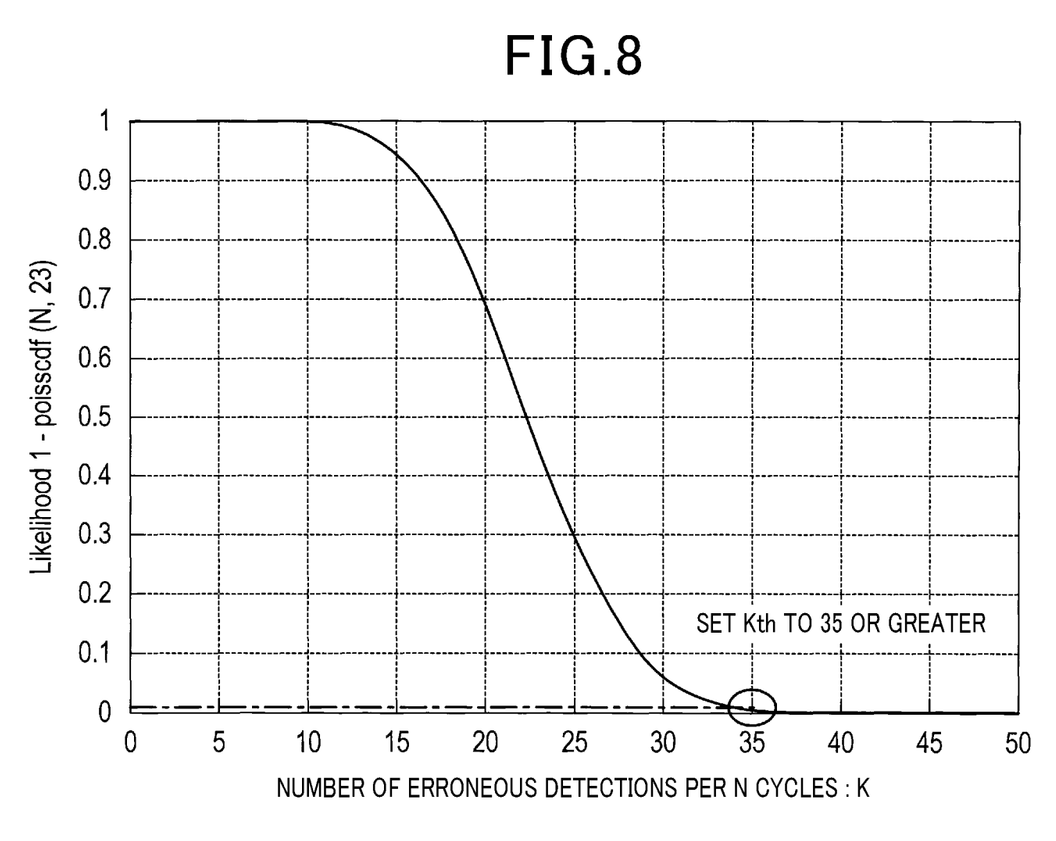
FIG. 8 is a graph of a not-rainy-weather likelihood used to set a rainy-weather determination threshold.
Figure 9:
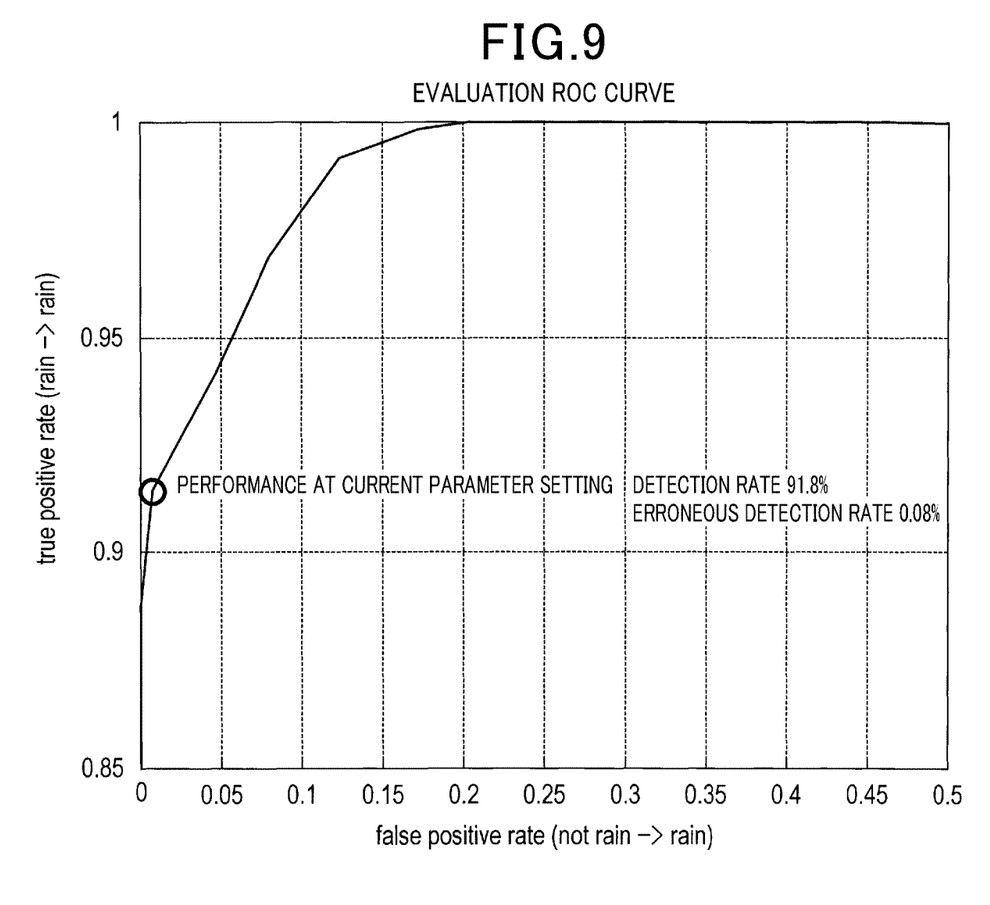
FIG. 9 is a receiver operating characteristic (ROC) curve showing changes in rainy-weather determination capability when the rainy-weather determination threshold is changed.

FIG. 8 is a graph of the non-rainy-weather likelihood L(K) determined with N=100 and λ=23. In addition, when the allowable value of the non-rainy-weather likelihood L(K) is 0.01, it is clear that the rainy-weather determination threshold Kth should be set to 35 or greater. FIG. 9 is a receiver operating characteristic (ROC) curve in which a probability of rainy weather being correctly detected (detection rate) and a probability of not-rainy weather being erroneously detected as rainy weather (erroneous detection rate) are determined with the rainy-weather determination threshold Kth being changed. In addition, it is clear that, when Kth=35, the detection rate is 91.8% and the erroneous detection rate is 0.08%. However, the ROC curve is determined through use of measurement results obtained in the 50th and subsequent cycles.

Returning to FIG. 6, when k(n)≥Kth (YES at S420), the processing unit 70 determines that the weather is rainy and advances the process to S430. The processing unit 70 updates the targeting threshold α and ends the present process. Meanwhile, when k(n)<Kth (NO at S420), the processing unit 70 determines that the weather is not rainy and advances the process to S440, The processing unit 70 resets the targeting threshold α to an initial value and ends the process.

At S430, the processing unit 70 updates the targeting threshold α to a value calculated by expression (5) using an erroneous detection rate $P_{fa}$ per single cycle and single bin calculated by expression (4).

[Formula 3]

$$P_{fa} = \frac{C_{fa}}{W} \quad (4)$$

$$\alpha = \text{Ceil}\left(\log \frac{\gamma}{P_{fa} \cdot L}\right) \quad (5)$$

However, γ indicates the occurrence rate of a false target, and Ceil(a) means that the value of a is rounded up to an integral value. In addition, expression (5) is based on expression (6) that expresses the occurrence rate γ of a false target. The expression (6) targets a peak that is based on clutter or the like that is not a target (erroneous detection rate $P_{fa}$ per single cycle and single bin) when the peak is observed within the range of L [bin] for α consecutive cycles. In addition, expression (6) indicates that a false target is generated.

[Formula 4]

$$\gamma = (L \cdot P_{fa})^{\alpha} \quad (6)$$

<Experiment>

Figure 10:
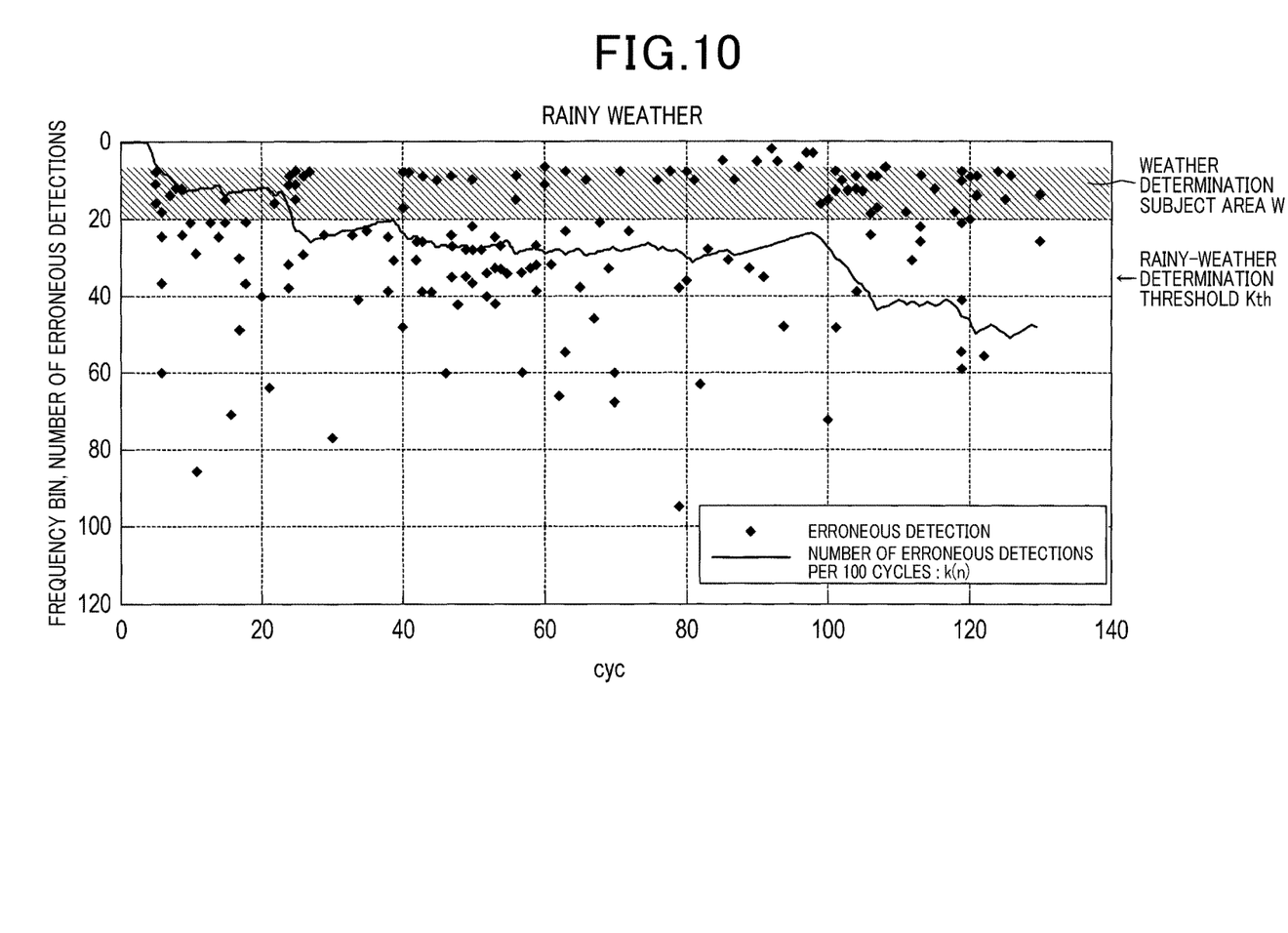
FIG. 10 is a graph showing detection case examples of erroneous detection and calculation results of the number of erroneous detections.

FIG. 10 is based on data obtained by the radar apparatus 10 being operated during rainy weather. In addition, FIG. 10 shows the frequency bins in which erroneous detection occurs per measurement cycle and the aspect of changes in the number of erroneous detections k(n) per 100 cycles. As shown in the drawing, erroneous detection occurs in various frequency bins. However, the number of erroneous detections to be counted are the number of erroneous detections within the weather determination subject area W that is from the 8th bin to the 20th bin. In this drawing, it is clear that rainy weather is correctly determined from about the 102nd to 103rd cycles in which k(n) exceeds the rainy-weather determination threshold Kth (=35).

<Effects>

As described above, the radar apparatus 10 determines whether or not the weather is rainy based on the number of erroneous detections that is the number of peaks that disappear without being targeted. In addition, when determined that the weather is rainy, the radar apparatus 10 updates the targeting threshold α to be a larger value as the number of erroneous detections k(n) increases. Therefore, in the radar apparatus 10, clutter can be suppressed from being erroneously targeted. As a result, the radar apparatus 10 can improve the capability of identifying and removing clutter.

According to the present embodiment, the radar apparatus 10 includes the frequency analyzing unit, the targeting unit, the rainy-weather determining unit, and the parameter updating unit. The frequency analyzing unit acquires the beat signal generated from the transmission signal and the reception signal at each predetermined measurement cycle. Furthermore, the frequency analyzing unit generates a power spectrum by performing frequency analysis of the beat signal. The targeting unit extracts, as a target, a peak confirmed to have historical connection over measurement cycles equal to the predetermined targeting threshold or more, from the peaks extracted from the power spectrums generated by the frequency analyzing unit. In addition, the number of peaks that have been detected in the previous measurement cycle or earlier by the targeting unit and are not confirmed to have historical connection to a peak detected in the current measurement cycle is set as the number of erroneous detections. The rainy-weather determining unit determines that the weather is rainy when the number of erroneous detections is greater than the predetermined rainy-weather determination threshold. The parameter updating unit updates the targeting threshold so as to be a larger value as the number of erroneous detections increases, when the rainy-weather determining unit determines that the weather is rainy.

Figure 3:
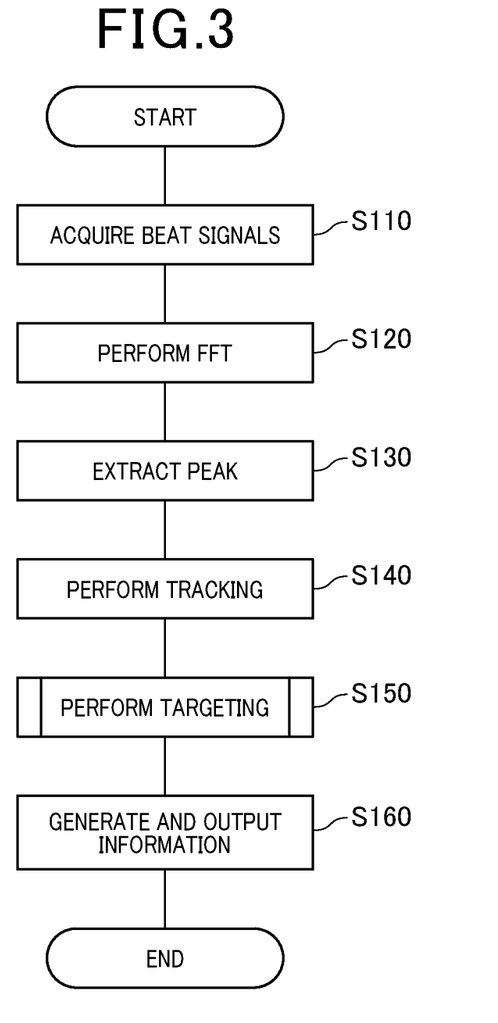
FIG. 3 is a flowchart of a target detection process performed by a processing unit mounted in the on-board system.

According to the present embodiment, frequency analyzing means is functionally configured by the processes at steps S110 and S120 shown in FIG. 3. In addition, targeting means is functionally configured by the process at step S150 in FIG. 3. Furthermore, rainy-weather determining means is functionally configured by the processes at steps S410 and S430 shown in FIG. 6. Parameter updating means is functionally configured by the process at step S430 in FIG. 6.

<Other Embodiments>

An embodiment of the present invention is described above. However, the present invention is not limited to the above-described embodiment. Various embodiments may be used.

Figure 11:
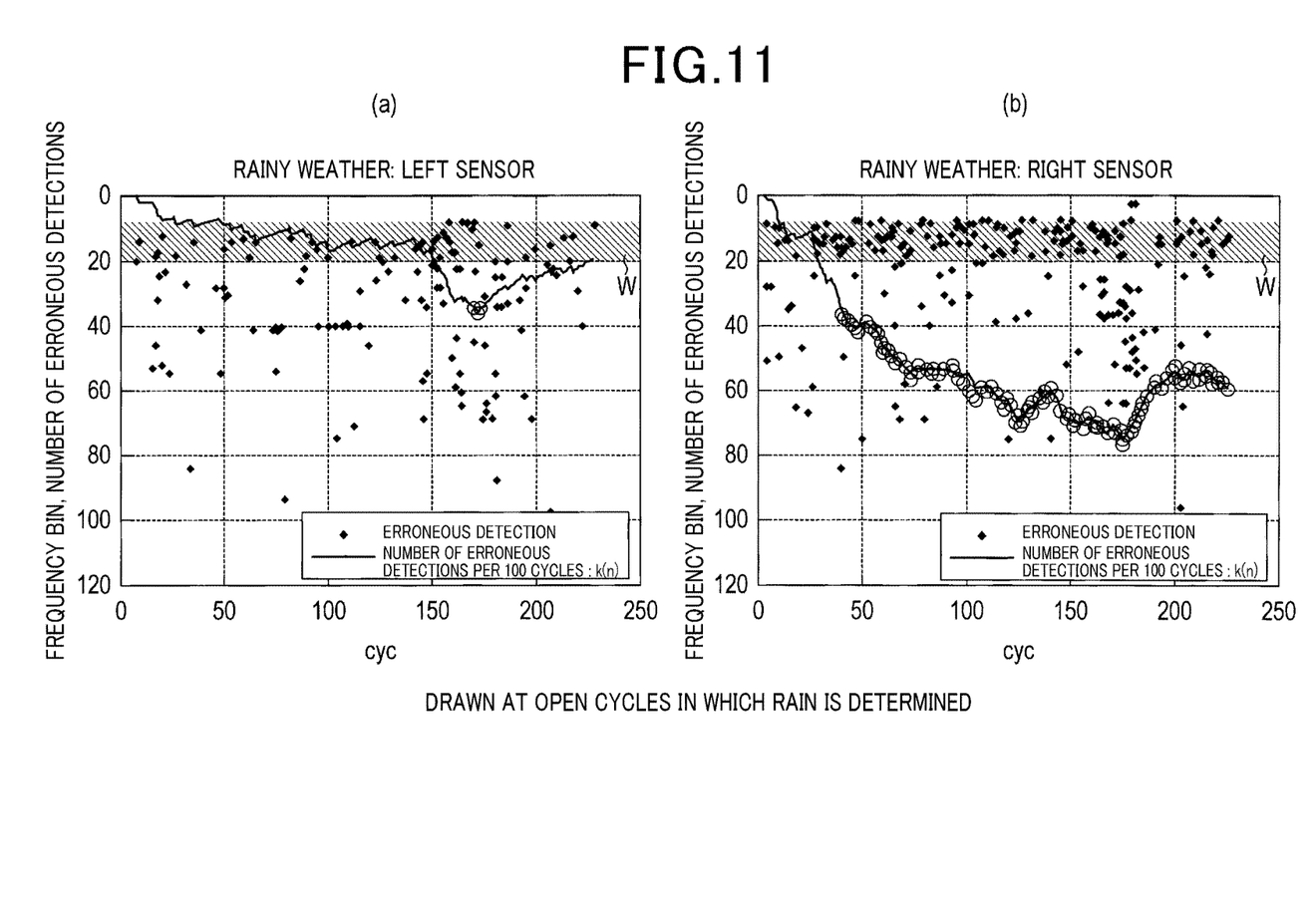
FIG. 11 contains graphs showing detection case examples, calculation results of the number of erroneous detections, and determination results of rainy-weather determination, when the radar apparatus is set on the left and right sides of a vehicle.

(1) According to the above-described embodiment, a case in which a single radar apparatus 10 is provided is described. Furthermore, according to the above-described embodiment, for example, the radar apparatus 10 may be attached to the left and right sides of a vehicle. When the radar apparatus 10 is attached to the left and right sides of the vehicle, as shown in FIG. 11, even when the weather is rainy, the radar apparatus 10 may be able to detect rainy weather only on one side depending on the advancing direction of the vehicle and the direction of wind. Therefore, when rainy weather is detected on either of the left and right sides of the vehicle, the radar apparatus 10 may be configured to update the targeting threshold α of both.

(2) According to the above-described embodiment, the determination result regarding whether or not the weather is rainy is used to update and reset the targeting threshold α, and is used only within the radar apparatus 10. Furthermore, according to the above-described embodiment, the determination result may be configured to be provided to an external apparatus such as the driving assistance ECU 100, together with the observation values.

(3) According to the above-described embodiment, the dual-frequency CW is used as the radar wave. Furthermore, according to the above-described embodiment, a multi-frequency CW that uses frequencies of three or more types may also be used.

(4) According to the above-described embodiment, a specific example of the parameters used for determination and the like is given. Furthermore, according to the above-described embodiment, the parameters are not limited to the specific example and may be set as appropriate so as to meet required performance.

(5) Each constituent element of the present invention is conceptual and is not limited to the above-described embodiments. For example, a function provided by a single constituent element may be dispersed among a plurality of constituent elements. Functions provided by a plurality of constituent elements may be integrated in a single constituent element. In addition, at least a part of a configuration according to the above-described embodiments may be replaced by a publicly known configuration having a similar function.

Furthermore, at least a part of a configuration according to an above-described embodiment may be added to or replace another configuration according to another above-described embodiment.

REFERENCE SIGNS LIST

1: on-board system
10: radar apparatus
20: transmission circuit
30: distributor
40: transmission antenna
50: reception antenna
51: antenna element
60: reception circuit
61: mixer
70: processing unit
70A: CPU
70B: ROM
70C: RAM
70D: coprocessor
70E: block
80: output unit
100: driving assistance ECU

The invention claimed is:

1. A radar apparatus for detecting at least a relative speed to a target using Doppler effect, the radar apparatus comprising:
a frequency analyzing unit that acquires a beat signal generated from a transmission signal and a reception signal at each predetermined measurement cycle, and generating a power spectrum by performing frequency analysis of the beat signal;
a targeting unit that extracts, as a target, a peak that is confirmed to have historical connection over the measurement cycles equal to or more than a predetermined targeting threshold, from peaks extracted from the power spectrum generated by the frequency analyzing unit;
a rainy-weather determining unit which determines that weather is rainy in response to a number of erroneous detections being greater than a predetermined rainy-weather determination threshold, the number of erroneous detections being a number of peaks that have been detected in a previous measurement cycle or earlier by the targeting unit and are not confirmed to have historical connection to a peak detected in a current measurement cycle; and
a parameter updating unit that updates the targeting threshold so as to be a larger value as the number of erroneous detections increases in response to the rainy-weather determining unit determining that the weather is rainy.

2. The radar apparatus according to claim 1, wherein:
the rainy-weather determining unit counts peaks detected within a predetermined weather determination subject area in the number of erroneous detections.

3. The radar apparatus according to claim 2, wherein:
the weather determination subject area is set based on an occurrence distribution of the number of erroneous detections extracted for each frequency bin in the power spectrum.

4. The radar apparatus according to claim 3, wherein:
the rainy-weather determining unit uses, as the rainy-weather determination threshold, the number of erroneous detections in response to a not-rainy-weather likelihood calculated from the number of erroneous detections being equal to or less than a predetermined threshold, under a supposition that a distribution of the number of erroneous detections occurring during not-rainy weather follows a Poisson distribution.

5. The radar apparatus according to claim 4, wherein:
the parameter updating unit updates the targeting threshold such that a probability of the targeting means erroneously detecting clutter as a target becomes equal to or less than a predetermined allowable value.

6. The radar apparatus according to claim 5, wherein:
the targeting unit determines that historical connection is present in response to a distance on the power spectrum between a peak detected in the previous measurement cycle and a peak detected in the current measurement cycle being within an allowable value.

7. The radar apparatus according to claim 6, wherein:
a multi-frequency continuous wave (CW) is transmitted and received.

8. The radar apparatus according to claim 7, wherein:
the radar apparatus is mounted and used in a vehicle.

9. The radar apparatus according to claim 1, wherein:
the rainy-weather determining unit uses, as the rainy-weather determination threshold, the number of erroneous detections in response to a not-rainy-weather likelihood calculated from the number of erroneous detections being equal to or less than a predetermined threshold, under a supposition that a distribution of the number of erroneous detections occurring during not-rainy weather follows a Poisson distribution.

10. The radar apparatus according to claim 1, wherein:
the parameter updating unit updates the targeting threshold such that a probability of the targeting means erroneously detecting clutter as a target becomes equal to or less than a predetermined allowable value.

11. The radar apparatus according to claim 1, wherein:
the targeting unit determines that historical connection is present in response to a distance on the power spectrum between a peak detected in the previous measurement cycle and a peak detected in the current measurement cycle being within an allowable value.

12. The radar apparatus according to claim 1, wherein:
a multi-frequency continuous wave (CW) is transmitted and received.

13. The radar apparatus according to claim 1, wherein:
the radar apparatus is mounted and used in a vehicle.

14. A signal processing method for a radar apparatus that detects at least a relative speed to a target using Doppler effect, the signal processing method comprising:
acquiring a beat signal generated from a transmission signal and a reception signal for each predetermined measurement cycle, and generating a power spectrum by performing frequency analysis of the beat signal;
extracting, as a target, a peak that is confirmed to have historical connection over the measurement cycles equal to or more than a predetermined targeting threshold, from peaks extracted from the power spectrum generated by the frequency analysis;
determining that weather is rainy in response to a number of erroneous detections being greater than a predetermined rainy-weather determination threshold, the number of erroneous detections being a number of peaks that have been detected in a previous measurement cycle or earlier by the targeting and are not confirmed to have historical connection to a peak detected in a current measurement cycle; and
updating the targeting threshold so as to be a larger value as the number of erroneous detections increases in response to the weather being determined to be rainy.

* * * * *